US008870135B2

(12) United States Patent
Grubbs

(10) Patent No.: US 8,870,135 B2
(45) Date of Patent: Oct. 28, 2014

(54) UNIVERSAL HANGER DEVICE

(76) Inventor: Robert Grubbs, Bristol, WI (US)

(*) Notice: Subject to any disclaimer, the term of this patent is extended or adjusted under 35 U.S.C. 154(b) by 257 days.

(21) Appl. No.: 13/207,194

(22) Filed: Aug. 10, 2011

(65) Prior Publication Data
US 2013/0037661 A1 Feb. 14, 2013

(51) Int. Cl.
F16M 11/00 (2006.01)
F16L 3/14 (2006.01)
F16L 3/24 (2006.01)

(52) U.S. Cl.
CPC .... F16L 3/14 (2013.01); F16L 3/24 (2013.01)
USPC .......................... 248/200; 248/317

(58) Field of Classification Search
USPC ........ 248/200, 205.1, 317; D8/382, 354, 349, D8/373, 356, 363, 384, 355, 366, 380, D8/381; 138/106, 107, 158; 24/457, 570; 16/387, 389, 234, 236, 237, 248, 249
See application file for complete search history.

(56) References Cited

U.S. PATENT DOCUMENTS

| 2,508,340 | A | * | 5/1950 | Spearrin | 223/49 |
| 3,517,903 | A | * | 6/1970 | Gutshall | 248/288.11 |
| 3,588,019 | A | * | 6/1971 | Cozeck | 248/228.6 |
| 4,318,518 | A | | 3/1982 | Davis | |
| 4,447,030 | A | * | 5/1984 | Nattel | 248/27.1 |
| 4,469,466 | A | * | 9/1984 | Hotz | 403/388 |
| 5,310,255 | A | * | 5/1994 | Ranallo | 312/334.5 |
| 5,544,031 | A | * | 8/1996 | Blanton | 362/396 |
| 5,810,303 | A | * | 9/1998 | Bourassa et al. | 248/205.1 |
| 5,897,086 | A | * | 4/1999 | Condon | 248/220.1 |
| 6,131,361 | A | * | 10/2000 | Murphy | 52/712 |
| D442,471 | S | * | 5/2001 | Willett | D8/354 |
| 6,462,961 | B1 | * | 10/2002 | Johnson et al. | 361/825 |
| 6,669,156 | B2 | * | 12/2003 | East et al. | 248/300 |
| D551,538 | S | * | 9/2007 | Pearce | D8/354 |
| 7,926,766 | B2 | * | 4/2011 | Tjerrild | 248/58 |
| 2008/0078894 | A1 | * | 4/2008 | Morrow | 248/200 |

OTHER PUBLICATIONS

Ductworkinstallation.com, Light Commercials Ductwork Installation, website article, Link:http://www.ductworkinstallation.com/DIGuide/LightCommercials/tabid/77/Default.aspx, 2002-2011.
Erico, Hangers, website article, Link: http://www.erico.com/products.asp?folderid=107, 2011.
BK Services Online, Mounting Bracket, website article, Link: http://www.bkserviceonline.co.uk/shop/index.php?main_page=product_info&cPath=92_93&products_id=10236.
Alibaba.com Global Trade Starts Here, Tubular Motor/ Accessories/ Angle Bracket, website article, Link: http://www.alibaba.com/product-gs/331306817/tubular_motor_accessories_Angle_Bracket.html, 1999-2010, Hong Kong.
EO Edmund Optics Worldwide, 90° Angle Brackets, website article, Link: http://www.edmundoptics.com/products/displayproduct.cfm?productID=1635, 2011.

(Continued)

Primary Examiner — Alfred J Wujciak
(74) Attorney, Agent, or Firm — Valauskas Corder LLC

(57) ABSTRACT

A universal hanger device mounts components of a heating, ventilation, and air conditioning ("HVAC") system within an architectural structure. The universal hanger device allows HVAC components such as duct members to be mounted in any position and/or configuration.

3 Claims, 6 Drawing Sheets

(56) References Cited

OTHER PUBLICATIONS

Simpson Strong-Tie, External Cladding Installation Solutions Direct Cladding Connector: ABC—Angle Bracket for Cladding, website article, Link: http://www.strongtie.co.uk/products/type_print.php?typeID=116&familyID=7.

Screen shot of Internet web page i01.i.aliimg.com—angle bracket with holes and slots Link: http://i01.i.aliimg.com/photo/v0/345703151/galvanized_angle_bracket.summ.jpg.

Screen shot of Internet web page images.productserve.com—angle bracket with holes Link: http://images.productserve.com/preview/1228/95593601.jpg.

Screen shot of Internet web page 2.iming.com—angle bracket with parallel slots Link: http://2.imimg.com/data2/QG/TX/HELLOTD-1801813/b10-250x250.jpg.

Screen shot of Internet web page i01.i.aliimg.com—angle bracket with slots along two different axes, Link: http://i01.i.aliimg.com/photo/v1/305714245/slotted_angle_plate.summ.jpg.

Screen shot of Internet web page i01.i.aliimg.com—angle bracket with slots, Link:http://i01.i.aliimg.com/photo/v0/324978235/SLOTTED_ANGLE_PLATE_GS_6601A76_.summ.jpg.

Screen shot of Internet web page www.valleyrolling.com—angled hanger/bracket with slots and holes Link: http://www.valleyrolling.com/images.gbr-n.gif.

* cited by examiner

UNIVERSAL HANGER DEVICE

FIELD OF THE INVENTION

The present invention relates generally to heat, ventilation, and air conditioning ("HVAC") systems, and more specifically to devices used to mount components such as duct members of HVAC systems to architectural structures.

BACKGROUND

HVAC technology is used to control indoor temperature and air flow in residential and commercial architectural structures thereby resulting in improved comfort to many clients using such systems. Due to the widespread use of HVAC systems, there is an ongoing need for improvements to such systems.

A HVAC system generally connects one or more main heating and cooling units. For example, a combined furnace and condenser may be connected through the use of various HVAC components. The HVAC components are usually secured to the walls or ceilings in various positions and configurations depending on the location of air vents.

A desired improvement is to increase the effectiveness and efficiency of air flow. In addition, there is a desire to improve and streamline installation of HVAC systems and related components such as duct members. For purposes of this application the term "duct member" is any shape or size tube, canal, pipe, or conduit by which a fluid, air, or other substance is conducted or conveyed. Duct members exist in a variety of constructions including various sizes and/or various shapes such as round, rectangular, flat, oval, or any combination thereof.

Generally, various hanger mechanisms are used to hang components such as duct members from elements found within architectural structures. Elements found within architectural structures include, for example, support beams, ceilings, walls, joists, and studs. Conventional hanger mechanisms include one or more brackets, clamps, rods, bandings, wires, and straps. One embodiment of a conventional hanger mechanism includes an upper attachment, hanger, and lower attachment. The upper attachment secures the hanger mechanism to an element of the architectural structure and the lower attachment secures the duct member to the hanger mechanism.

More specifically, a single rod hanger mechanism includes a rod secured to an element of an architectural structure. The rod attaches to a strap—otherwise referred to as "band" or "banding"—that wraps around the outside surface of the duct member. In certain embodiments, the single rod hanger mechanism may further include a clamp such as a C-clamp. The C-clamp attaches to the element of the architectural structure. One end of the rod is secured to the C-clamp and the other end of the rod attaches to the strap that wraps around the outside surface of the duct member.

A double rod hanger includes two rods secured to an element of an architectural structure. Each rod attaches to a pair of semicircular bands that encircles the duct member. The rods are spaced from one another at a distance approximately equal to the diameter of the duct member. In this manner, support of the duct member is shared equally by both rods. In the embodiments described above, the banding is usually sized to match the size (diameter or width) of the duct member.

One disadvantage with conventional hanger mechanisms is that they are not offered in a "one-size-fits-all". Certain hanger mechanisms are provided in different sizes and shapes to accommodate specific size/shape duct members. Therefore, an installer must stock and have on-hand the appropriate hanger mechanisms to properly install the components of the HVAC system thereby minimizing delays and work stoppages.

Another disadvantage with conventional hanger mechanisms is that they accommodate only one mounting type in terms of position and/or configuration. For example, a hanger mechanism used to mount a duct member vertically within an architectural structure cannot be used to mount a duct member horizontally. Furthermore, a hanger mechanism that mounts a duct member by supporting it from the bottom cannot be used to mount the duct member by supporting it from the top.

Another disadvantage with conventional hanger mechanisms is that an installer must correctly select the hanger mechanism for installing the duct member to the architectural structure. Often times, the installer may select a certain hanger mechanism to realize that it is not the proper selection during installation. This may be particularly problematic when the installer is installing components of a HVAC system on the ceiling element of an architectural structure. Considerable time is wasted when the installer must set aside the duct member, return to the ground, obtain the correct hanger mechanism, return to the ceiling, and install the duct member.

Another disadvantage is that conventional hanger mechanisms or duct members may need to change if locations for the installation of duct members change. For example, an installation planned for a ceiling requires a certain hanger mechanism and a duct member according to a certain size and/or shape. If the location for the installation changes from the ceiling to a wall, a different hanger mechanism and different sized/shaped duct member may be needed from that as originally required for the ceiling installation.

Another disadvantage with conventional hanger mechanisms is that material is often times wasted. Material that is ordered and not used is usually put into stock or returned for a fee of some sort. Additionally, material that is not utilized or that is trimmed during installation may be scrapped.

Improper installation of HVAC components costs clients' money and reduces their comfort every time the HVAC system runs.

There is a need for a hanger device that is universal such that the hanger device can be used to install duct members of any size and/or shape as well as support and/or mount duct members in any configuration. The present invention satisfies this need.

SUMMARY OF THE INVENTION

The present invention is directed to a universal hanger device for HVAC applications. The universal hanger device according to the invention can be used with conventional hanger mechanisms such as one or more brackets, clamps, rods, bandings, wires, and straps to install duct members. The universal hanger device facilitates the installation of any size and/or shape duct members. Additionally, the universal hanger device of the invention may support the duct member from the top, bottom, or side of the duct member such that it can be mounted in any configuration—horizontal, vertical, or anywhere in between.

In one embodiment, the universal hanger device includes a mounting leg component including a mounting aperture and an attachment leg component including an attachment aperture with two attachment slots, one attachment slot positioned on each side of the attachment aperture element. In one embodiment, the mounting leg component and attachment leg component are integrally formed at an angle θ, for example, ninety degrees.

The universal hanger device is configured to mount a duct member using a single point application, a dual point application, or both. A single point application utilizes the attachment aperture of the attachment leg component. A dual point application utilizes the attachment slots of the attachment leg component. A single point and dual point application utilizes the attachment aperture and attachment slots of the attachment leg component.

The universal hanger device is configured so that a duct member may be suspended from or secured to the universal hanger device. The point from which the duct member is suspended or secured to the universal hanger device may be different than the point at which the universal hanger device is anchored. The duct member may be mounted either parallel or perpendicular to the universal hanger device with respect to the attachment slots.

The universal hanger device may be manufactured through one or more processes, for example, extrusion, injection molding, and stamping.

In an embodiment where the universal hanger device is configured to mount a duct member using a single point application, a rod hanger mechanism may be used. The rod mechanism includes a rod and banding. The universal hanger device is attached to an element of an architectural structure. The rod is secured to the mounting aperture of the universal hanger device on one end and to the banding on the other end. The banding is positioned in a loop around the outside surface of the duct member. A duct member may be suspended at any distance from the universal hanger device by using a rod hanger mechanism and length of banding desired.

In another embodiment where the universal hanger device is configured to mount a duct member using both a single point application and dual point application, the rod hanger mechanism may further include a clamp such as a C-clamp. The C-clamp attaches to the element of the architectural structure. One end of the rod is secured to the C-clamp and the other end of the rod attaches to the universal hanger device. A strap wraps around the outside surface of the duct member and attaches to the attachment slots of the universal hanger device.

In an embodiment where the universal hanger device is configured to mount a duct member using a dual point application, a strap mechanism is used. The strap mechanism includes a band or banding. The universal hanger device is attached to an element of an architectural structure. The banding is routed within the slots of the universal hanger device and positioned around the outside surface of the duct member.

One advantage of the present invention is that banding may be purchased in bulk for use with the universal hanger device. More specifically, a roll of banding may be purchased so that an installer may cut bands to any desired length in order to create any size loop that accommodates the outside surface of a duct member. For example, an installer may cut a band of a certain length from the roll to create a loop for a 4 foot diameter duct member. The band is then used with the universal hanger device in either the single point application, dual point application, or both. The universal hanger device facilitates the use of any size banding, which eliminates the need for the installer to have on-hand a specific size band.

Furthermore, scrap material may be used. For example, it is contemplated that scrap sheet metal may be used to make banding. This is extremely advantageous in that material may be recycled thereby reducing waste. Furthermore, utilizing scrap material for use with the universal hanger device eliminates the need for specific size banding such that the installer does not have to have every variety of banding on-hand.

The universal hanger device provides an improvement over conventional devices. Specifically, any size and/or shape duct member may be mounted by using the universal hanger device of the present invention. Additionally, the duct member may be mounted in any configuration—horizontal, vertical, or anywhere in between. The universal hanger device eliminates the need for size specific conventional hanger mechanisms. The universal hanger device also eliminates the requirement for installers to select conventional hanger mechanisms based upon the size/shape duct member and the architectural structure to which the duct member is to be mounted. The universal hanger device minimizes delays and work stoppages.

The described embodiments are to be considered in all respects only as illustrative and not restrictive, and the scope of the invention is not limited to the foregoing description. Those of skill in the art will recognize changes, substitutions and other modifications that will nonetheless come within the scope of the invention and range of the claims.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION OF THE INVENTION

The present invention is directed to a universal hanger device for HVAC applications. Specifically, the universal hanger device of the invention may support a duct member from the top, bottom, or side of the duct member such that it can be mounted in any configuration—horizontal, vertical, or anywhere in between. The universal hanger device mounts any size and/or shape duct member. The universal hanger device is configured so that a duct member may be suspended from or secured to the universal hanger device. A duct member may be suspended at any distance from the universal hanger device by using a rod hanger mechanism. A duct member may be secured to the universal hanger device by using a band hanger mechanism. The point from which the duct member is suspended or secured may be different than the point at which the universal hanger device is anchored.

Figure 1A:
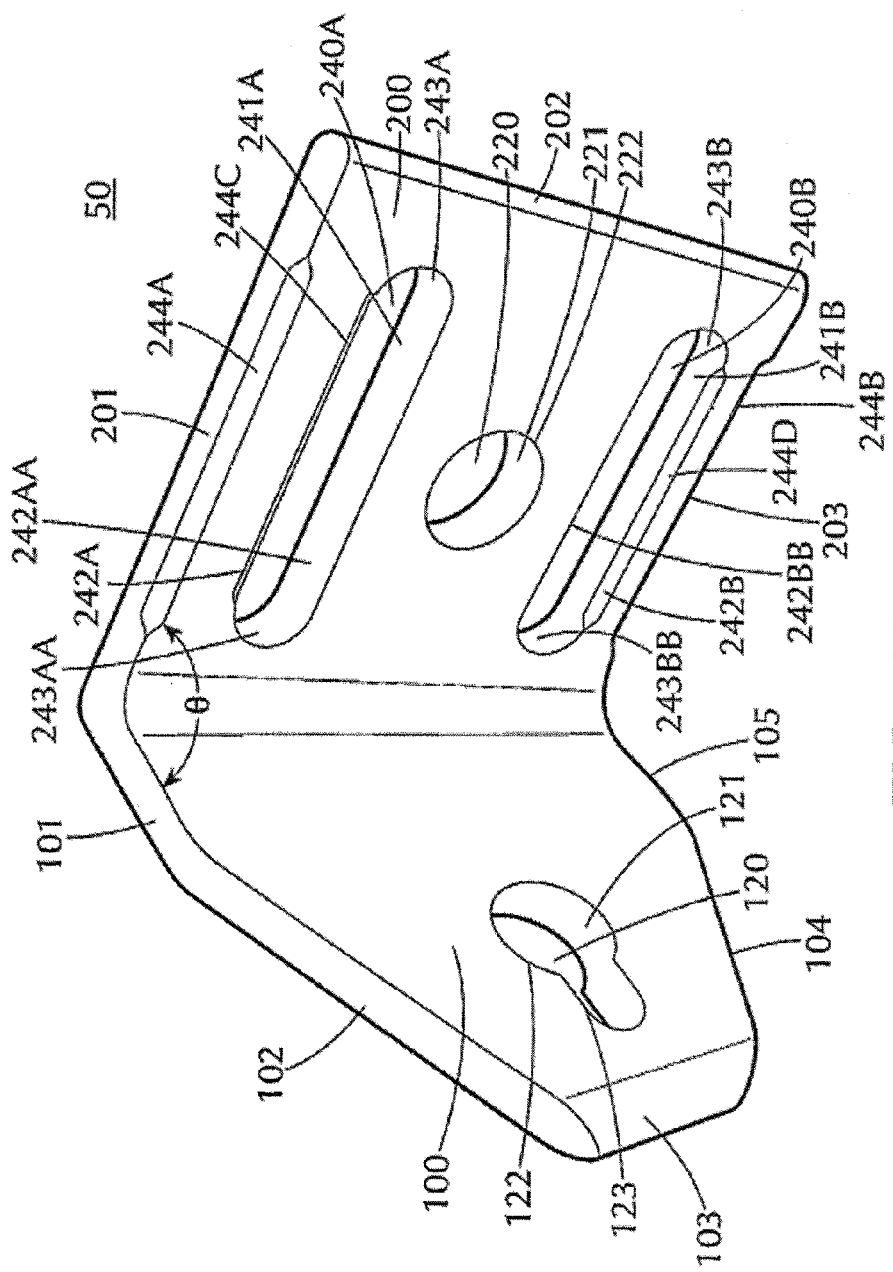
FIG. 1A illustrates a perspective view of a universal hanger device according to one embodiment of the invention.
Figure 1B:
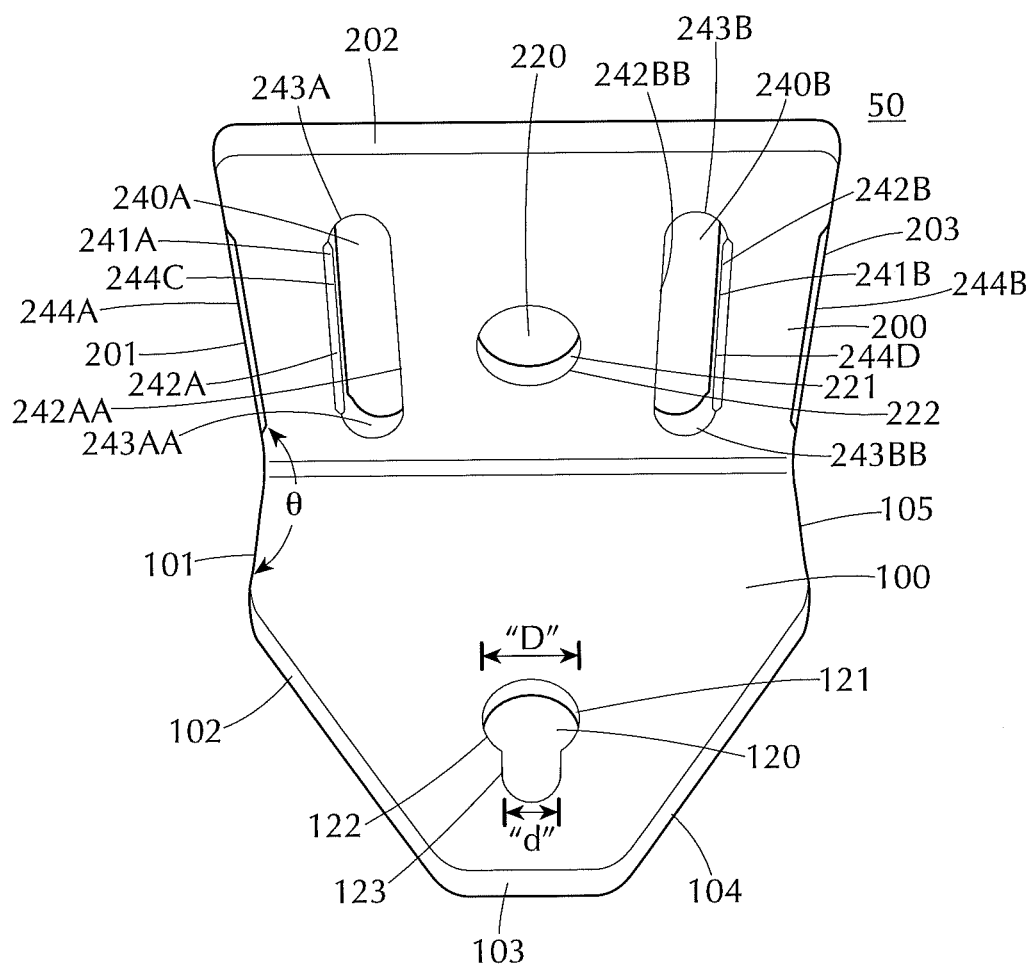
FIG. 1B illustrates another perspective view of the universal hanger device according to one embodiment of the invention.

As shown in FIG. 1A and FIG. 1B, the universal hanger device 50 includes a mounting leg component 100 and an attachment leg component 200. The mounting leg component 100 and the attachment leg component 200 are integrally formed at an angle θ. As best seen in FIG. 1A, the mounting leg component 100 and attachment leg component 200 are integrally formed at approximately a 90 degree angle θ. However, it is contemplated that angle θ may be any degree angle—acute or obtuse.

The universal hanger device 50 may be made from any material, including but not limited to, steel, aluminum, plastic, and metallic alloys. It is contemplated that the universal hanger device 50 is made of a material with sufficient strength to support duct members when mounted. It is also contemplated that the material may be galvanized to reduce or prevent corrosion. It is further contemplated that the material may be paintable in order to match elements of the architectural structure to which the universal hanger device is mounted.

The mounting leg component 100 is defined by walls 101, 102, 103, 104, 105. As best shown in FIG. 1B, walls 102, 104 are truncated. The truncated walls, 102, 104 accommodate any space constraints that may be encountered when anchoring the universal hanger device to an element of an architectural structure. Although the universal hanger device 50 is illustrated with five walls 101, 102, 103, 104, and 105, it is contemplated the mounting leg component 100 may be defined by three walls—without truncated walls.

The mounting leg component 100 includes a mounting aperture element 120 defined by surface 121. Surface 121 includes a circular portion 122 and an oval portion 123. As seen in FIG. 1B, the diameter "D" of the circular portion 122 is greater than the diameter "d" of the oval portion 123. The portions 122, 123 of the mounting aperture element 120 accommodate different hardware members (i.e., different sizes) as well as facilitate different anchor location points for the universal hanger device 50. As shown in FIG. 1B, the mounting aperture element 120 is generally centered between the truncated walls 102, 104.

The attachment leg component 200 is defined by walls 201, 202, 203 and includes an attachment aperture element 220 and attachment slot elements 240A, 240B. The attachment aperture element 220 is defined by surface 221. Surface 221 includes a circular portion 222. The attachment aperture element 220 accommodates a rod hanger mechanism used to suspend a duct member at any distance from the universal hanger device 50. As shown in FIG. 1B, the attachment aperture element 220 is generally centered between walls 201, 203.

Attachment slot elements 240A, 240B are defined by surfaces 241A, 241B. Surface 241A includes two linear portions 242A, 242AA and two circular portions 243A, 243AA. Surface 241B includes two linear portions 242B, 242BB and two circular portions 243B, 243BB. Preferably, the attachment slot elements 240A, 240B are parallel to one another and are positioned on each side of the attachment aperture element 220. Specifically, each attachment slot element 240A, 240B are positioned between the attachment aperture element 220 and walls 201, 203, respectively. The attachment slot elements 240A, 240B accommodate a band hanger mechanism used to secure a duct member to the universal hanger device 50.

As best seen in FIG. 1B, the walls 201, 203 of the attachment leg component 200 include a chamfer edge 244A, 244B. Similarly, the linear portions 242A, 242B of the attachment slot elements 240A, 240B include a chamfer edge 244C, 244D, respectively. The chamfer edges 244A, 244B, 244C, 244D may be at any angle with respect to the attachment leg component 200. For example, the chamfer edges 244A, 244B may be at any angle with respect to the walls 201, 203 and chamfer edges 244C, 244D may be at any angle with respect to surfaces 241A, 241B of the attachment slot elements 240A, 240B. The chamfer edges 244A, 244B, 244C, 244D prevent damage to banding when positioned near walls 201, 203 of the attachment leg component 200 and near linear portions 242A, 242B of the attachment slot elements 240A, 240B when securing a duct member.

In one embodiment, the chamfer edge 244A of the wall 201 of the attachment leg component 200 is at approximately a forty-five degree angle and the chamfer edge 244C of the linear portion 242A is at approximately a forty-five degree angle so that chamfer edges 244A, 244C are configured to reside in planes that are perpendicular to one another. Likewise, the chamfer edge 244B of the wall 201 is at approximately a forty-five degree angle and the chamfer edge 244D of the linear portion 242B is at approximately a forty-five degree angle so that chamfer edges 244B, 244D are configured to reside in planes that are perpendicular to one another. In other words, in this embodiment, chamfer edges 244A, 244D reside in planes that are parallel to one another, and similarly, chamfer edges 244B, 244C reside in planes that are parallel to one another. Although the chamfer edges are described in one embodiment as being at approximately forty-five degree angles, any angle is contemplated.

Figure 2A:
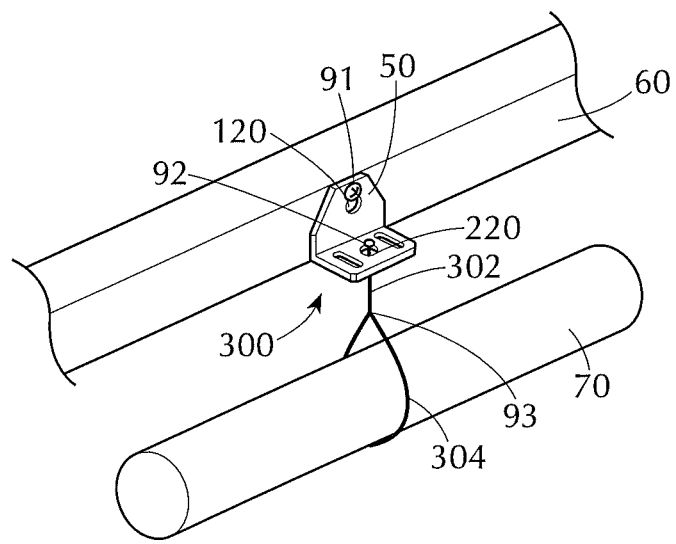
FIG. 2A illustrates the universal hanger device used in mounting a duct member according to one embodiment of the invention.
Figure 2B:
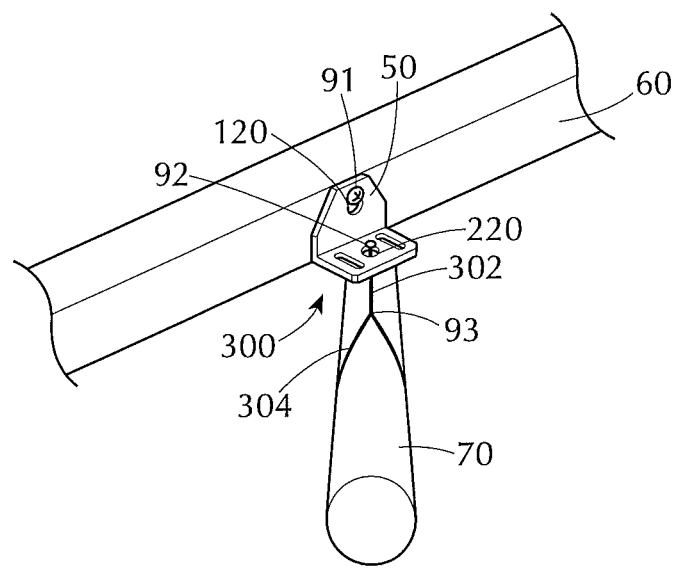
FIG. 2B illustrates the universal hanger device used in mounting a duct member according to another embodiment of the invention.

FIG. 2A and FIG. 2B illustrate embodiments in which the universal hanger device 50 is configured to mount a duct member 70 using a single point application. Specifically, the single point application uses a rod hanger mechanism 300 including a rod 302 and a band 304. The universal hanger device 50 is attached to an element 60 of an architectural structure. Specifically, the mounting aperture element 120 of the mounting leg component 100 receives hardware 91 such as a screw to attach the universal hanger device 50 to the element 60. Using hardware 92 such as a bolted joint, the rod 302 is secured at one end to the attachment aperture element 220 of the attachment leg component 200. In one embodiment the attachment aperture element 220 is 7/16 inch to accommodate a ⅜ inch diameter rod. The other end of the rod 302 is secured to band 304 using hardware 93 such as a bolted joint. The band 304 is positioned in a loop around the outside surface of the duct member 70. The duct member 70 may be suspended at any distance from the universal hanger device 50 by using a rod hanger mechanism 300. As shown, the universal hanger device 50 used with a rod hanger mechanism 300 allows the duct member 70 to be configured horizontally with respect to the element 60 of the architectural structure. Although the duct member 70 is shown as circular in cross-sectional shape in FIG. 2A and FIG. 2B, it is contemplated that the duct member may also be square or rectangular in cross-sectional shape. Furthermore, it is contemplated that a double rod hanger could be used. A double rod hanger includes two rods secured to an element of an architectural structure. Each rod attaches to the attachment slot elements 240A, 240B and a pair of semicircular bands loops around the outside surface of the duct member.

Figure 2C:
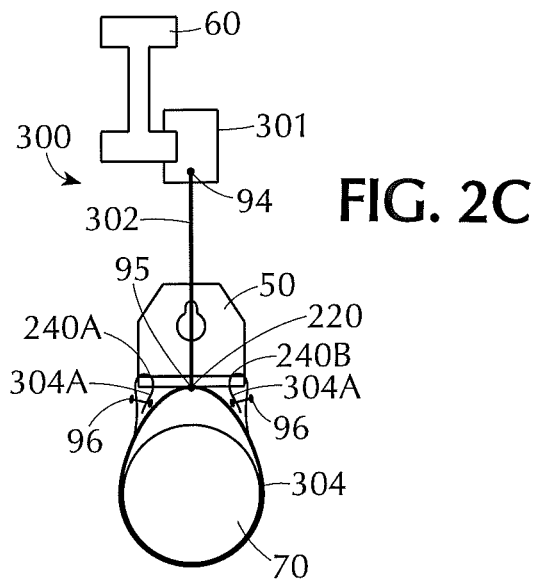
FIG. 2C illustrates the universal hanger device used in mounting a duct member according to another embodiment of the invention.
Figure 2D:
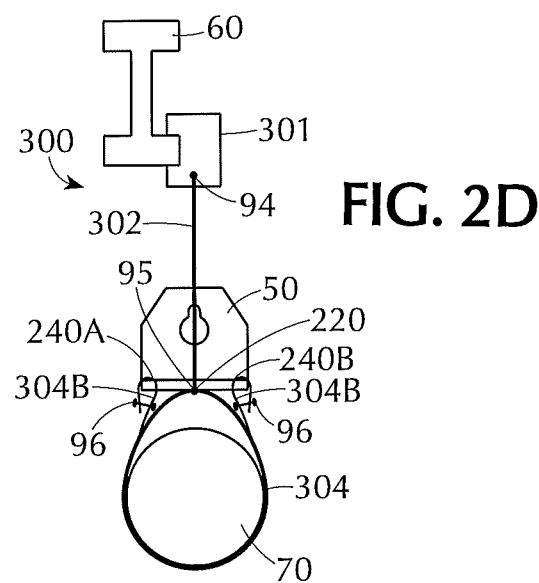
FIG. 2D illustrates the universal hanger device used in mounting a duct member according to another embodiment of the invention.
Figure 2E:
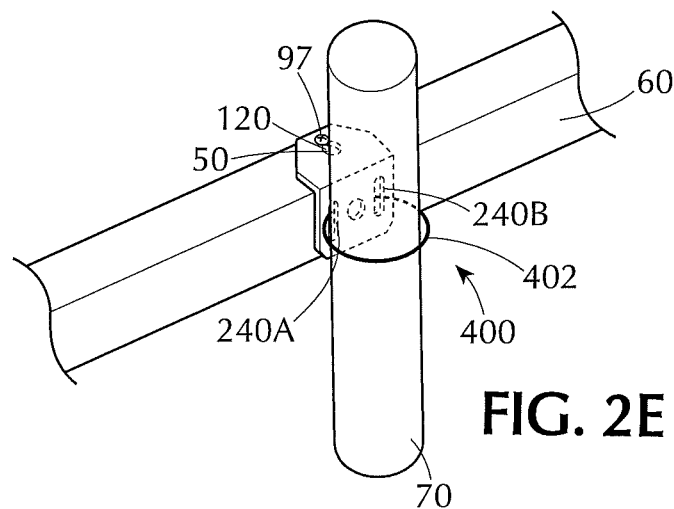
FIG. 2E illustrates the universal hanger device used in mounting a duct member according to another embodiment of the invention.
Figure 2F:
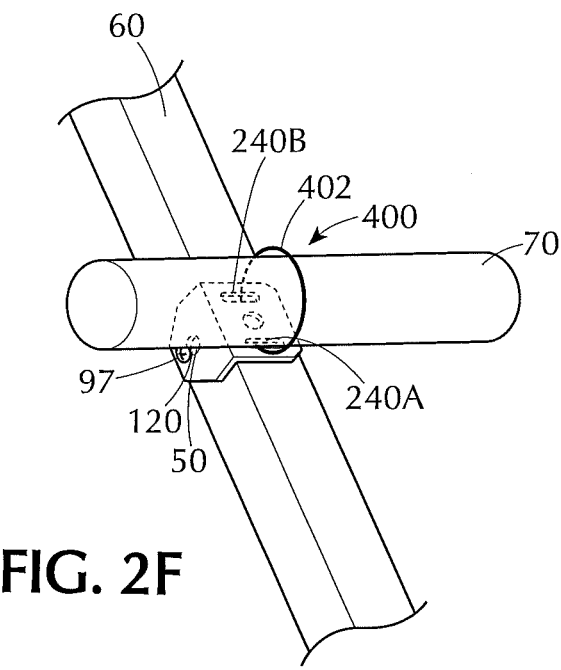
FIG. 2F illustrates the universal hanger device used in mounting a duct member according to another embodiment of the invention.
Figure 2G:
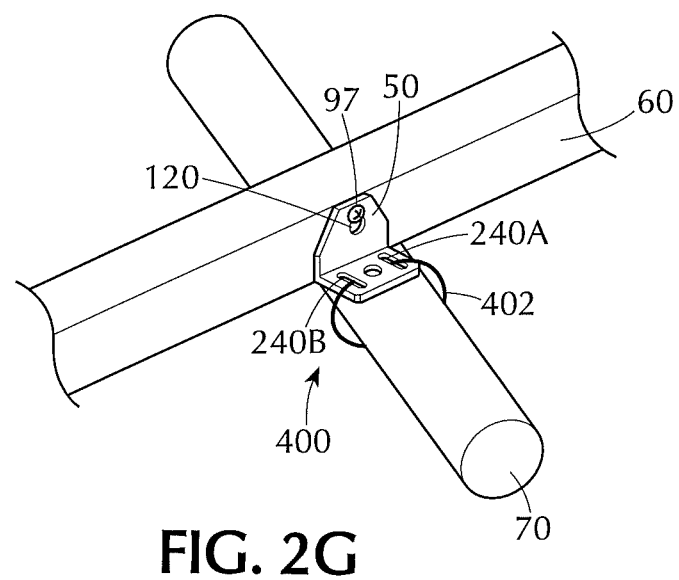
FIG. 2G illustrates the universal hanger device used in mounting a duct member according to another embodiment of the invention.
Figure 2H:
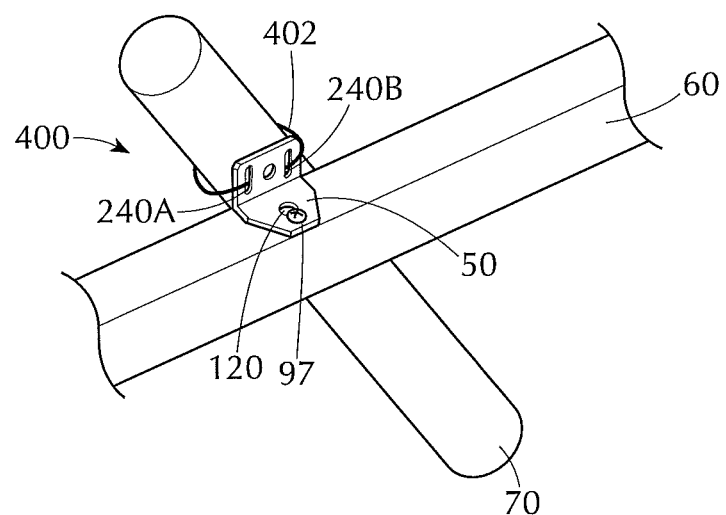
FIG. 2H illustrates the universal hanger device used in mounting a duct member according to another embodiment of the invention.

FIG. 2C and FIG. 2D illustrate both a single point application and dual point application in which the rod hanger mechanism 300 includes a C-clamp 301, rod 302, and a band 304. The C-clamp 301 grabs the element 60 of the architectural structure. One end of the rod 302 attaches to the C-clamp 301 using hardware 94 such as a bolted joint. The other end of the rod 302 passes through the attachment aperture element 220 of the universal hanger device 50 and is secured using hardware 95 such as a bolted joint. Banding 304 is routed within the attachment slot elements 240A, 240B of the universal hanger device 50 and positioned in a loop around the outside surface of the duct member 70.

In the embodiment shown in FIG. 2C, the ends 304A of the banding 302 are routed over walls 201, 203 including chamfer edges 244A, 244B, respectively, and through attachment slot elements 240A, 240B including chamfer edge 244C, 244D, respectively (see FIG. 1A and FIG. 1B). The ends 304A are secured to the banding 302 by hardware 96 such as screws. This arrangement is aesthetically pleasing since the ends 304A cannot be seen by being positioned between the duct member 70 and banding 304.

In the embodiment shown in FIG. 2D, the ends 304B of the banding 302 are routed through attachment slot elements 240A, 240B including chamfer edge 244C, 244D, respectively and over walls 201, 203 including chamfer edges 244A, 244B, respectively (see FIG. 1A and FIG. 1B). The ends 304B are secured to the banding 302 by hardware 96 such as screws. This arrangement may be used when aesthetics is unimportant since the ends 304B can be seen by being positioned outside the duct member 70 and banding 304.

FIG. 2E, FIG. 2F, FIG. 2G, and FIG. 2H illustrate embodiments in which the universal hanger device 50 is configured to mount a duct member 70 using a dual point application. Specifically, the dual point application uses a strap mechanism 400 including band 402. The universal hanger device 50 is attached to an element 60 of an architectural structure. Specifically, the mounting aperture element 120 of the mounting leg component 100 receives hardware 97 such as screws to attach the universal hanger device 50 to the element 60. The band 402 is routed within the attachment slot elements 240A, 240B of the universal hanger device 50 and positioned in a loop around the outside surface of the duct member 70. In one embodiment, the attachment slot elements are 1⅛" inches in length in order to receive band having a 1 inch width.

Specifically, the band 402 is routed through the attachment slot element 240A such that the band 402 rests over chamfer edge 244A and chamfer edge 244C. Similarly, the band 402 is routed through the attachment slot element 240B such that the band 402 rests over chamfer edge 244B and chamfer edge 244D. The ends of the band 402 may be secured to itself, to the universal hanger device 50, or to another fixed object such as an element of the architectural structure.

As shown in FIG. 2E, FIG. 2F, FIG. 2G, and FIG. 2H, the duct member 70 may be secured parallel or perpendicular to the universal hanger device 50 with respect to the attachment slot elements 240A, 240B and configured horizontally or vertically with respect to the element 60 of the architectural structure. Again, although the duct member 70 is shown as circular in cross-sectional shape in FIG. 2E, FIG. 2F, FIG. 2G, and FIG. 2H, it is contemplated that the duct member may also be square or rectangular in cross-sectional shape.

While the present invention has been described with reference to particular embodiments, those skilled in the art will recognize that many changes may be made thereto without departing from the scope of the present invention. Each of these embodiments and variants thereof is contemplated as falling with the scope of the claimed invention, as set forth in the following claims.

What is claimed is:

1. A universal hanger device for mounting a duct member of a heating, ventilation, and air conditioning ("HVAC") system to an element of an architectural structure, comprising:

a mounting leg component and an attachment leg component integrally formed at an angle θ, wherein the angle θ is approximately ninety degrees;
   the mounting leg component defined by a first mounting leg wall, a second mounting leg wall, a third mounting leg wall, a truncated fourth mounting leg wall, and a truncated fifth mounting leg wall,
   the mounting leg component comprising a mounting aperture element generally centered between the first mounting leg wall and the third mounting leg wall,
   the mounting aperture element defined by a first surface including a circular portion with a first diameter and an oval portion with a second diameter, the first diameter of the circular portion greater than the second diameter of the oval portion,
the attachment leg component defined by a first attachment leg wall, a second attachment leg wall, and a third attachment leg wall,
   the first attachment leg wall including a first beveled chamfer edge extending along a majority of the first attachment leg wall,
   the third attachment leg wall including a second beveled chamfer edge extending along a majority of the third attachment leg wall,
the attachment leg component comprising an attachment aperture element generally centered between the first attachment leg wall and the third attachment leg wall, the attachment aperture element defined by a second surface including a circular portion,
   the attachment leg component further comprising a first attachment slot element and a second attachment slot element,
   the first attachment slot element generally centered between the attachment aperture element and the first attachment leg wall, the first attachment slot element defined by a third surface including a first linear portion, a second linear portion, a first circular portion and a second circular portion, the first linear portion including a third beveled chamfer edge extending along a majority of the first linear portion, wherein the third beveled chamfer edge of the first attachment slot element is positioned adjacent to the first beveled chamfer edge of the first attachment leg wall;
   the second attachment slot element generally centered between the attachment aperture element and the third attachment leg wall, the second attachment slot element defined by a fourth surface including a third linear portion, a fourth linear portion, a third circular portion and a fourth circular portion, the third linear portion including a fourth beveled chamfer edge extending along a majority of the third linear portion, wherein the fourth beveled chamfer edge of the second attachment slot is positioned adjacent to the second beveled chamfer edge of the third attachment leg wall;
the first beveled chamfer edge, the second beveled chamfer edge, the third beveled chamfer edge and the fourth beveled chamfer edge configured to prevent damage to a strap mechanism routed within the first attachment slot and the second attachment slot while securing the duct member.

2. The universal hanger device for mounting a duct member of a heating, ventilation, and air conditioning ("HVAC") system to an element of an architectural structure according to claim 1, wherein the first beveled chamfer edge resides in a first plane and the third beveled chamfer edge resides in a third plane, the first plane being perpendicular to the third plane.

3. The universal hanger device for mounting a duct member of a heating, ventilation, and air conditioning ("HVAC") system to an element of an architectural structure according to claim 1, wherein the second beveled chamfer edge resides in a second plane and the fourth beveled chamfer edge resides in a fourth plane, the second plane being perpendicular to the fourth plane.

* * * * *